July 3, 1934.  W. S. LONG  1,964,854
AUTOMATIC CUT-OUT FOR ELECTRICAL SUPPLY SOURCES IN MOTOR VEHICLES
Filed April 21, 1933  2 Sheets-Sheet 1
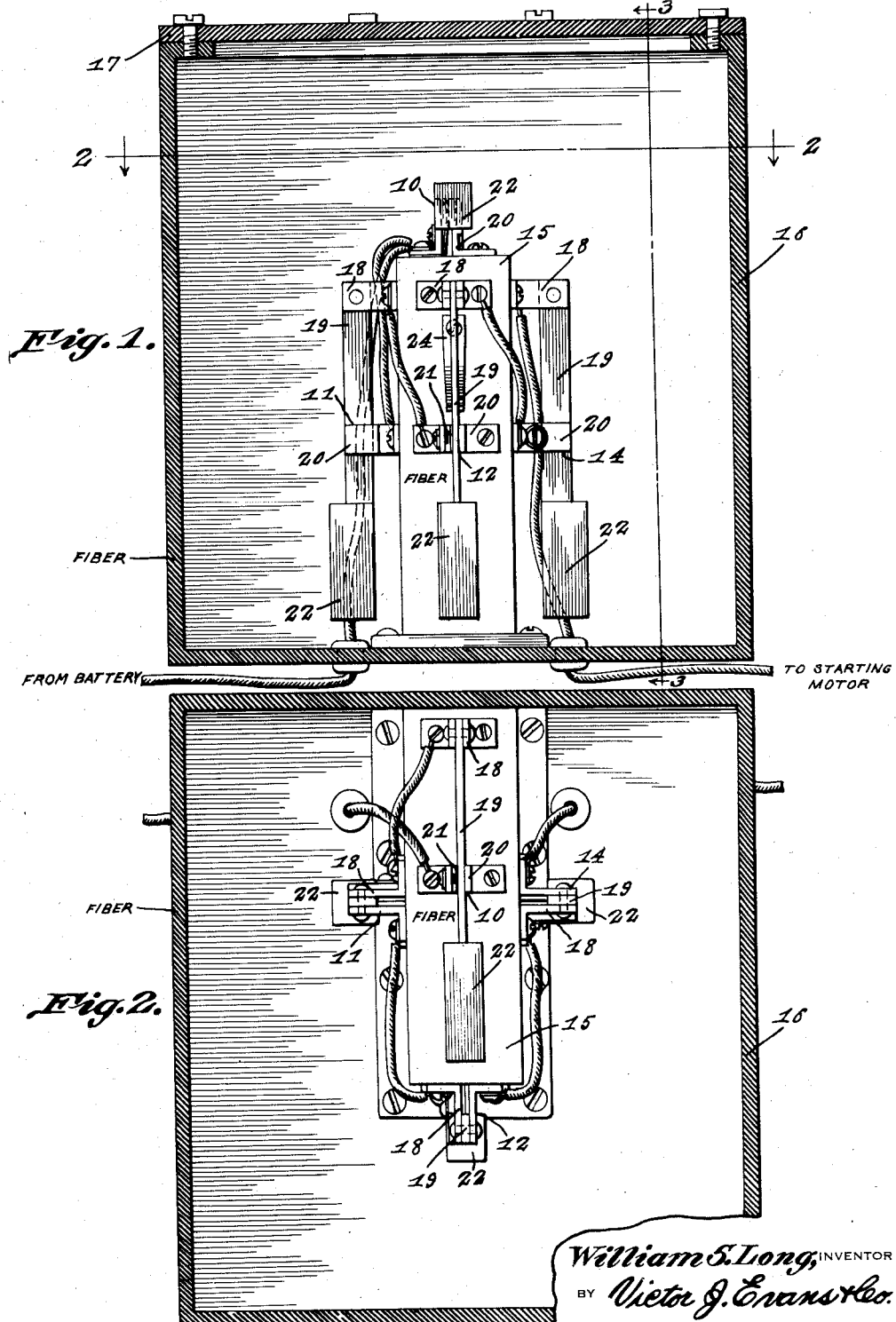

July 3, 1934.   W. S. LONG   1,964,854
AUTOMATIC CUT-OUT FOR ELECTRICAL SUPPLY SOURCES IN MOTOR VEHICLES
Filed April 21, 1933   2 Sheets-Sheet 2
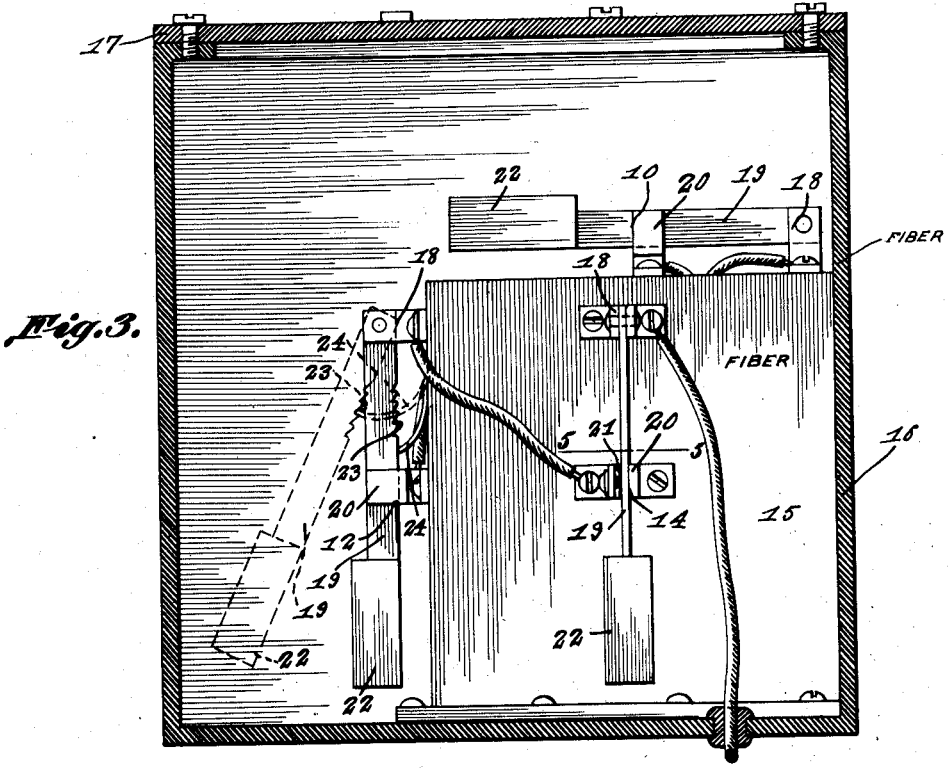
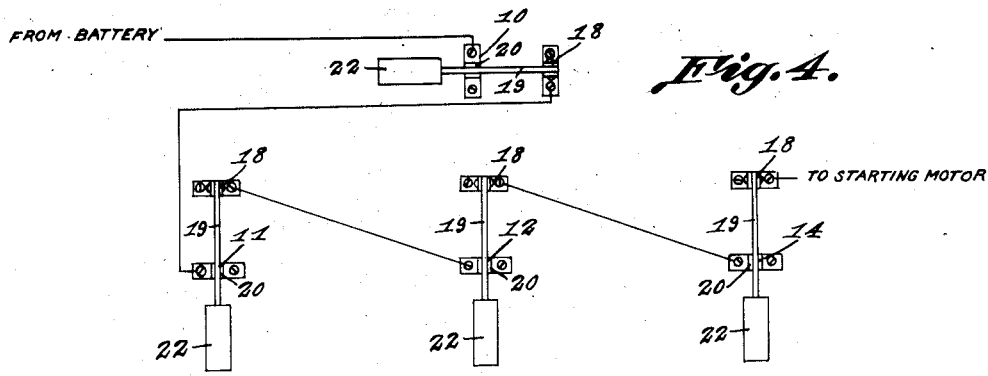
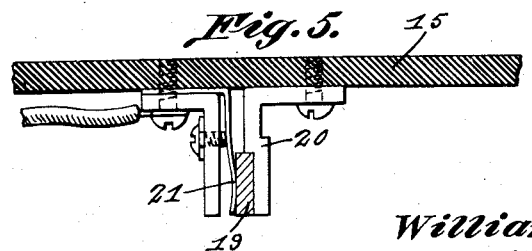
William S. Long, INVENTOR
BY Victor J. Evans & Co.
ATTORNEY Patented July 3, 1934

1,964,854

UNITED STATES PATENT OFFICE 1,964,854

AUTOMATIC CUT-OUT FOR ELECTRICAL SUPPLY SOURCES IN MOTOR VEHICLES

William S. Long, East Radford, Va.

Application April 21, 1933, Serial No. 667,278

3 Claims. (Cl. 200—52)

The object of the invention is to provide a device for use in conjunction with motor vehicles of any character, whether aircraft or for land or water travel, that will effectively open the electrical supply source in the event of collisions or accidents where the fuel might be spilled and consequently ignited as a result of activity in any electric circuit of the vehicle; and generally to provide a device of the above indicated character which is of simple form and susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a vertical sectional view of a device constructed in accordance with the invention.

Figures 2 and 3 are sectional views on the planes indicated by the lines 2—2 and 3—3 of Figure 1.

Figure 4 is a diagrammatic view of the electrical connection between the plurality of switches comprised in the invention.

Figure 5 is a detail sectional view on the plane of one edge of the spring clip.

The invention is intended as a safety device to be used in connection with motor vehicles of any sort to automatically cut off the electric current at substantially the source of supply in the event of wrecks from collisions or accidents, so that there may be no opportunity of ignition of the fuel that may be spilled as a result of such accidents or collisions. Preferably the invention comprises a plurality of serially connected switches 10, 11, 12 and 14 mounted respectively on the top, one side, the end and the opposite side of a block 15 of insulating material which is preferably housed in a case 16 which may be of similar insulating material but which is provided with a screw retained removable top 17. The block is seated at the center of the case on the bottom of the latter and in abutting engagement with one of the side walls, so that it stands spaced from the remaining side walls and from the top, thus providing clearance spaces for the opening of the several switches.

Each switch comprises a hinged clip 18 secured to the block, a blade 19 pivotally connected with the hinged clip and a bifurcated clip 20 between the fingers of which the blade 19 is received. A friction spring 21 is incorporated in the bifurcated clip to bear firmly against the switch blade, so as to hold it in engagement with the clip except in cases of an unusual pull in the direction to disengage the blade from the clip.

The blades 19 extend beyond the bifurcated or friction clips 20 and terminate in heads 22 which are made comparatively heavy, so that their inertia may effect blade releasing operation under the conditions under which the invention is designed to operate.

The whole device is designed to be connected in series with the battery adjacent to the latter and therefore one terminal of the battery is connected to one of the switches, as for example the switch 10, while a connection is taken off of the final switch of the series to be led to the electrical equipment, such as the ignition coil, starting motor or whatnot.

The blade 19 of the switch 12 on its inner edge is formed with a series of ratchet teeth 23 which, when the blade is withdrawn from its friction clip will be engaged with the extremity of a bowed leaf spring 24 which will prevent it dropping back into engagement with the clip.

The device as a whole is preferably positioned on the vehicle with the switch 12 forwardly. Then in the event of a collision, the momentum previously acquired by the head will carry the switch blade to open position in which it will be retained by the engagement of the spring 24 with the ratchet teeth. Thus, the circuit on the battery will be opened.

In the same way, lateral impact will result in opening the switches 11 or 14, depending on which side of the vehicle the impact is received. Likewise, the switch 10 will be opened by the vehicle overturning. Any one of the switches, since they are all serially connected, will open the battery circuit and if the device be mounted close to the battery, as it will be in installation, it will function to thus cut off the electric current at the source and thus eliminate the otherwise attendant hazards.

The invention having been described, what is claimed as new and useful is:

1. A device for the purpose indicated comprising a casing, an insulating block mounted in the casing adjacent one of the walls thereof, and serially connected switches mounted on the exposed sides of the block and provided with means to shift them to open position on sudden arresting of any movement previously imparted to the casing, the switches comprising hingedly mounted blades and friction clips with which the blades are engaged, the latter having weighted heads beyond the friction clips.

2. A device for the purpose indicated comprising a casing, an insulating block mounted in the casing adjacent one of the walls thereof, and serially connected switches mounted on the exposed sides of the block and provided with means to shift them to open position on sudden arresting of any movement previously imparted to the casing, the switches comprising hingedly mounted blades and friction clips with which the blades are engaged, the latter having weighted heads beyond the friction clips and the blades of certain of the switches being mounted with the heads depending.

3. A device for the purpose indicated comprising a casing, an insulated block mounted in the casing in contact with the bottom and rear walls thereof, said block being spaced from the top side and front walls of the casing, and a plurality of knife switches mounted one on top of the block and one each on the front and opposite side walls of the block, said switches comprising hingedly mounted blades and cooperating spring clips, the blades beyond the clips and at the ends remote from the hinges being provided with weights, all of said switches being connected in electrical series with the terminal switches connected to the terminals of the circuit to be controlled.

WILLIAM S. LONG.